United States Patent Office  3,786,111
Patented Jan. 15, 1974

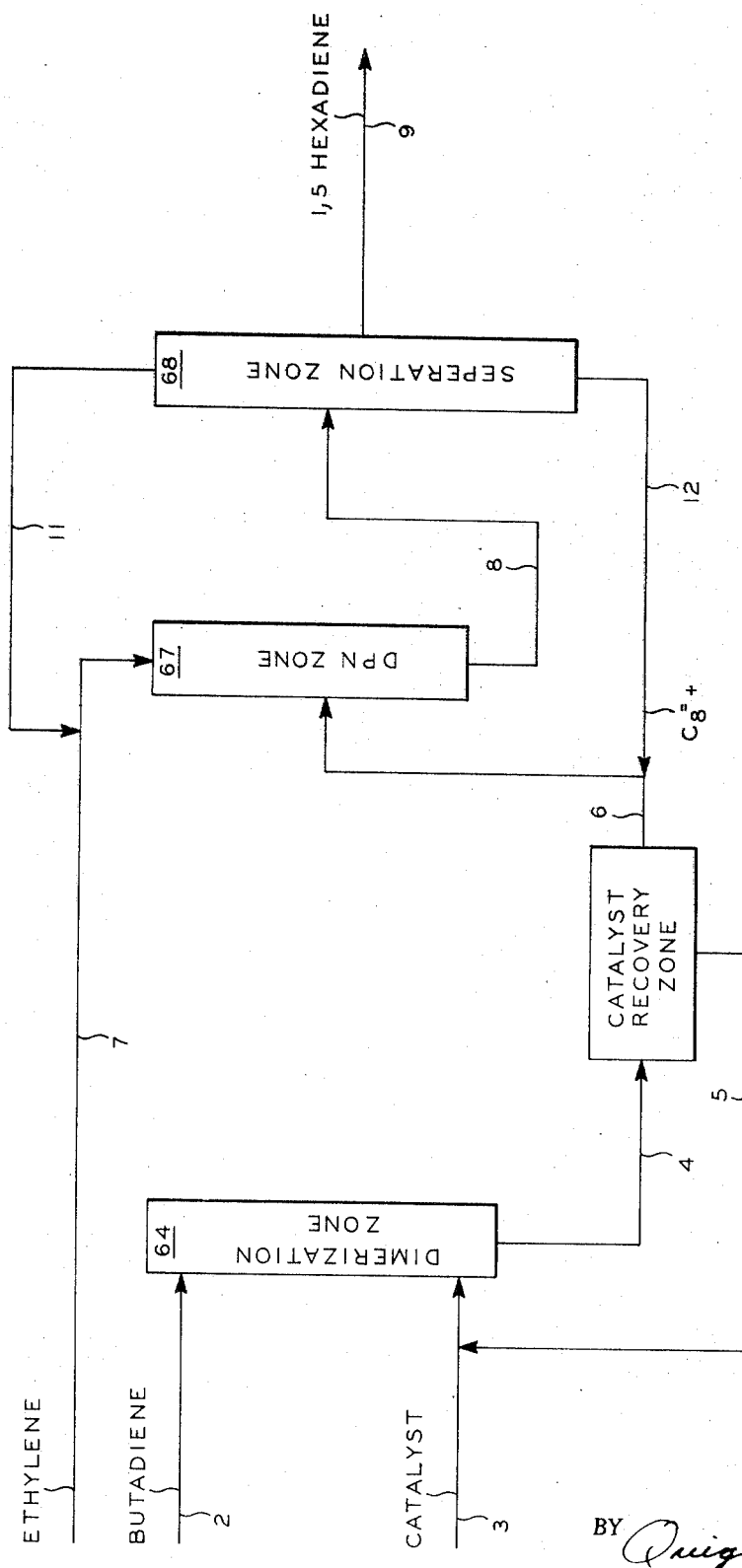

3,786,111
PROCESS FOR THE PREPARATION OF
1,5-HEXADIENE
Van C. Vives, Bartlesville, Okla., assignor to
Phillips Petroleum Company
Filed Dec. 27, 1971, Ser. No. 211,962
Int. Cl. C07c 3/62
U.S. Cl. 260—680 R
10 Claims

ABSTRACT OF THE DISCLOSURE

A process for the preparation of 1,5-hexadiene from ethylene and 1,5-cyclooctadiene in the presence of an olefin disproportionation catalyst is described. By maintaining the olefin disproportionation reaction within certain limits to maintain high conversions, the formation of undesirable byproducts such as 1,5,9-decatriene can be avoided. A process for the preparation of 1,5-hexadiene from ethylene and butadiene is also disclosed wherein the 1,5-cyclooctadiene is prepared by cyclodimerization of butadiene.

BACKGROUND OF THE INVENTION

Field of the invention

This invention relates to the preparation of olefinic hydrocarbons from other olefin hydrocarbons. In a further aspect, this invention relates to the preparation of olefin hydrocarbons using olefin disproportionation. In a still further aspect, this invention relates to the preparation of 1,5-hexadiene from 1,5-cyclooctadiene and ethylene. In a still further aspect, this invention relates to the preparation of 1,5-hexadiene from ethylene and butadiene.

Description of the prior art 1,5-hexadiene is a valuable material in the synthesis of hydrocarbon elastomers. Specifically, this compound is used as a termonomer in elastomer formation. However, heretofore, this material has been available only as a byproduct from such reactions as the olefin disproportionation synthesis of 1,5,9-decatriene from ethylene and 1,5-cyclooctadiene; or by very expensive separation techniques from olefinic refinery streams.

The prior art has previously reported that the 1,5-cyclooctadiene can be prepared by cyclodimerization of butadiene over various catalysts. See for example, U.S. Pat. 3,250,817, Lapporte, of May 10, 1966, and U.S. 3,310,591, Zuech et al.

In addition, it is known that ethylene and cyclooctadiene can be contacted in the presence of an olefin disproportionation catalyst. See U.S. Pat. 3,424,811, Mango, of Jan. 28, 1969. However, as reported by Mango, the reaction of ethylene and 1,5-cyclooctadiene (hereinafter sometimes referred to as 1,5-COD) provides a reaction product wherein the total number of double bonds therein is equal to the sum of the double bonds in the reactants. Thus, the Mango process prepares 1,5,9-decatriene from the aforementioned feed olefins.

OBJECTS OF THE INVENTION

It is an object of this invention to prepare 1,5-hexadiene from ethylene and 1,5-cyclooctadiene. It is a further object of this invention to prepare 1,5-hexadiene from ethylene and butadiene. Other objects and advantages of my invention will be apparent from the following ssummary of the invention, detailed description of the invention, and the appended claims.

SUMMARY OF THE INVENTION

We have surprisingly discovered that when ethylene and 1,5-cyclooctadiene are contacted with an olefin dispropor- tionation catalyst under conditions at which the catalyst shows optimum disproportionation conversion of propylene to ethylene and butenes, the major product of the reaction is 1,5-hexadiene rather than 1,5,9-decatriene. Therefore, my process involves contacting the ethylene and 1,5-COD with the olefin disproportionation catalyst under conditions such that the production of the acyclic trienes and heavier olefinic materials is reduced and the production of 1,5-hexadiene is increased.

In a further embodiment of my invention I have discovered a process for producing 1,5-hexadiene from ethylene and butadiene, which comprises the steps of cyclodimerizing 1,3-butadiene in the presence of a suitable catalyst to provide 1,5-cyclooctadiene, and then converting ethylene and the 1,5-cyclooctadiene to 1,5-hexadiene under the conditions mentioned hereinabove in the preceding paragraph.

BRIEF DESCRIPTION OF THE DRAWING

The sole figure of the drawing is a simplified schematic flow diagram of my process for preparing 1,5-hexadiene from ethylene and butadiene.

DETAILED DESCRIPTION OF THE INVENTION

The conversion of 1,5-cyclooctadiene and ethylene to 1,5-hexadiene according to the olefin disproportionation reaction can be represented by the following equation:

(I) 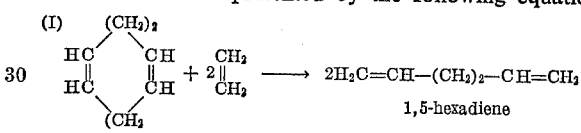

In the conversion process, the primary side reactions include the formation of 1,5,9-decatriene, 1,5,9,13-tetradecatetraene and $C_8$ isomers, some of which may be bicyclic. The formation of the two primary by-products can be represented by the following equations:

(II) 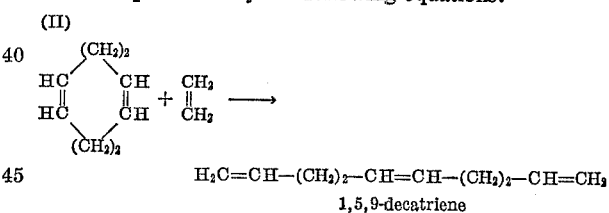

(III) 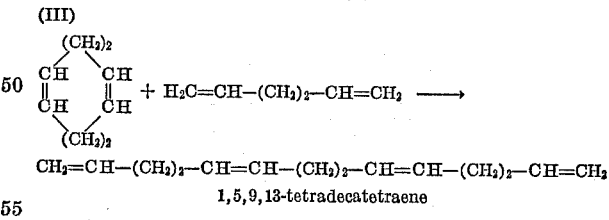

It is essential in the practice of my invention to reduce the formation of the 1,5,9-decatriene to a minimum level in order to insure the optimum production of the desired 1,5-hexadiene. This is accomplished by adjusting the conversion of the 1,5-cyclooctadiene and ethylene to a level wherein the theoretical quantity of ethylene required to provide 1,5-hexadiene does in fact react with the 1,5-cyclooctadiene reactant. The theoretical amount of ethylene required is 2 mols of ethylene per mol of 1,5-cyclooctadiene feed hydrocarbon.

Of course, the ability of the ethylene to react with the cyclooctadiene is dependent on the affinity of these reactants to active catalyst sites on the catalysts. Inherently, the activity of the catalyst becomes a factor. It is therefore clear that the specific reaction conditions which are used will initially be dependent on the activity of the olefin disproportionation catalyst.

As a generalization, conversions of at least 15 percent are required, but preferably conversions of the cyclooctadiene reactant of at least 75 percent are obtained. To accomplish my objective of maintaining the selectivity of the reaction to hexadiene, I prefer to use the very active disproportionation catalysts. These are discussed in more detail hereinbelow.

In addition, the amount of ethylene which is used is generally adjusted to provide at least a 5:1 mol ratio of ethylene to 1,5-cyclooctadiene. However, I have found that ratios of from 6:1 to 20:1 are suitable. Very good results have been achieved with ratios of from about 10:1 to 12:1.

Further, the rate at which 1,5-COD is introduced to the catalyst zone can be varied to optimize the preparation of the 1,5-hexadiene. Slower space rates favor the formation of 1,5-hexadiene. Space rates generally can vary from about 0.5 WHSV to about 1000 WHSV. In this respect, the amount of ethylene in the above mentioned ranges can be altered proportionally to the space rate.

The conversion is carried out using any suitable olefin disproportionation catalyst. Solid catalysts are preferred. The art has recently developed numerous catalysts which effect the olefin disproportionation reaction, also called the "olefin reaction," "olefin disproportionation," "metathesis," "mutual cleavage," and the like. The catalysts which have heretofore been discussed all have one thing in common; they are capable of promoting the reaction of propylene to form essentially equimolar amounts of ethylene and butenes.

It is to be understood that any catalyst which is capable of promoting the above described propylene reaction is suitable for use in my invention. Moreover, the catalysts which have been previously discovered exhibit the ability to catalyze the propylene reaction within different temperature ranges. Accordingly, the temperature and pressure employed in the reaction zone of my process will be that at which the specific olefin disproportionation catalyst exhibits satisfactory conversion of the propylene to ethylene and butenes. Preferably, the temperature and pressure will be the same at which the specic disproportionation catalyst exhibits maximum conversion of the propylene to thus insure a high conversion of the ethylene and 1,5-COD reactants.

Particularly suitable catalysts and the temperature and pressure range at which they exhibit the suitable and optimum activity for the propylene conversion are listed below in Table I.

Further in accordance with my invention, I have discovered that the cyclodimeriation of 1,3-butadiene which provides the 1,5-cyclooctadiene feed can advantageously be employed in combination with my olefin disproportionation process to provide 1,5-hexadiene.

The cyclodimerization of 1,3-butadiene to 1,5-cyclooctadiene can be effected by employing any catalyst suitable for this purpose. Numerous catalysts are presently known which effect this reaction. Non-limiting examples of such catalysts are those disclosed in U.S. Pat. 3,250,817, Lapporte, of May 10, 1966, and U.S. Pat. 3,310,591, Zuech et al., of Mar. 21, 1967. The disclosures of these patents are hereby incorporated by reference into this specification. As apparent from the above patents, the cyclodimerization catalyst is generally employed in the presence of an inert solvent. The catalyst and solvent are removed from the dimerization reactor effluent prior to contact with the olefin disproportionation catalyst.

Virtually all of the catalysts which effect the cyclodimerization of 1,3-butadiene to 1,5-cyclooctadiene also produce appreciable quantities of the cyclic butadiene trimer and lesser quantities of the cyclic butadiene tetramer. However, the unique feature of my process lies in the fact that it is not necessary to separate the cyclic dimer from the trimer or tetramer prior to contacting the dimerization effluent (containing 1,5-COD) with the olefin disproportionation catalyst. The triene and tertaene are readily convertible to 1,5-hexadiene in the disproportionation reactor. This is illustrated by the following formula:

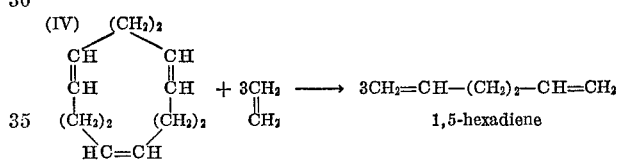

1,5,9-cyclododecatriene

The cyclic tetraene functions similarly.

Thus the combination of the steps of cyclodimerization and disproportionation are extremely useful. There is a minimum amount of loss from the first reaction, and recycle of byproducts to the disproportionation reaction zone results in very high ultimate yields. The commercial attractiveness of this process is readily apparent.

The process of my invention for the preparation of 1,5-hexadiene from ethylene and butadiene is depicted in the sole figure of the drawing.

TABLE I.—PREFERRED DISPROPORTIONATION CATALYSTS AND CONDITIONS THEREFOR

| Catalyst | Temp. °F. | | Pressure (p.s.i.g.) | | Space rate (WHSV) | | Reference |
|---|---|---|---|---|---|---|---|
| | Broad | Preferred | Broad | Preferred | Broad | Preferred | |
| WO₃/SiO₂ | 400–1,100 | 690–900 | 0–1,500 | 0–500 | 0.5–1,000 | 1–500 | 3,365,513 |
| MoO₃/SiO₂ | 400–1,100 | 500–1,000 | 0–1,500 | 0–500 | 0.5–1,000 | 1–500 | 3,365,513 |
| MoO₃/Al₂O₃ | 150–500 | 250–400 | 0–1,500 | 200–600 | 0.1–1,000 | 0.5–20 | 3,261,879 |
| WO₃/Al₂O₃ | 100–750 | 550–650 | 0–2,000 | 0–500 | 0.5–1,000 | 1–500 | |
| Re₂O₃/Al₂O₃ | −60–1,000 | 100–500 | 0–1,500 | 0–500 | 0.5–1,000 | 1–500 | |
| WO₃/AlPO₄ | 600–1,200 | 800–1,000 | 0–2,000 | 0–500 | 0.5–1,000 | 1–500 | |
| Re₂O₃/AlPO₄ | −60–1,000 | 50–250 | 0–2,000 | 0–500 | 0.5–1,000 | 1–500 | |
| MoO₃/AlPO₄ | 600–1,200 | 800–1,000 | 0–2,000 | 0–500 | 0.5–1,000 | 1–500 | |

Of the catalysts mentioned above, those whose preferred operating temperatures are in excess of 500° F. are particularly preferred. Of these, the tungsten oxide on silica catalyst is especially suitable because of its very high activity.

After the reaction of 1,5-COD and ethylene as described above, it is preferable that the reaction effluent undergo fractionation to remove those hydrocarbons having a lower boiling point than the 1,5-hexadiene product, and to subsequently remove the 1,5-hexadiene product, thereby providing a recycle stream containing the triene and tetraene byproducts. The byproducts are then returned to the reactor wherein they are converted to 1,5-hexadiene by cleavage with ethylene. Thus, the process of my invention is capable of producing the 1,5-hexadiene in very high ultimate yields at high selectivities.

A suitable cyclodimerization catalyst and solvent are introduced into dimerization zone 64 via line 3 and butadiene feed enters zone 64 via line 2. As explained previously, the cyclodimerization reaction produces 1,5-cyclooctadiene, butadiene trimers and tetramers. The effluent is withdrawn from zone 64 and passed in line 4 to the catalyst recovery zone. Therein solvent and catalyst are removed and returned to line 3 via 5 for use in zone 64.

The butadiene dimers and trimers are removed via line 6 and passed to olefin disproportionation (DPN) zone 67. Ethylene is introduced via line 7. This reaction provides high yields of 1,5-hexadiene when the conditions are adjusted as discussed above. The reaction also provides the byproduct heavier oligomers previously mentioned. The effluent of zone 67 in line 8 is passed to separation zone 68 wherein the materials lighter than 1,5-hexadiene (principally ethylene) are removed in line 11 and returned to line 7. The heavier oligomers and unconverted feed materials (principally $C_8^-+$)

are removed in line 12 and returned to zone 67 via line 6. 1,5-hexadiene product is removed via line 9 from separation zone 68.

For the sake of brevity, this disclosure has not set forth in detail the description of various apparatus and control systems, and other items necessary to operate the process of the invention. However, these particulars of operating the invention are readily apparent to one skilled in the art.

The invention can be further illustrated by the following examples. These examples are provided for the purpose of illustrating my process, and they should not be construed to limit my invention as described above.

EXAMPLE I

Two runs were made wherein ethylene and 1,5-cyclooctadiene were converted to 1,5-hexadiene. A 316 stainless steel ½ in. pipe, about 16 inches long was employed as the reactor. The catalyst was a tungsten trioxide/silica disproportionation catalyst containing 6.8 wt. percent $WO_3$, which was screened to 28/48 mesh. The catalyst was activated at 1050° F. in a flow of air for several hours, then stored under nitrogen until used. The catalyst was activated in place in the reactor, or in a muffle furnace, or both. In most runs 2.5 grams of catalyst was employed mixed with 2.5 grams of inert alpha alumina as filler.

The cyclooctadiene was purified by passage through a column containing 13X molecular sieves at the top and 28/48 mesh activated MgO at the bottom.

During the reaction period, samples were collected at various intervals and analyzed by GLC. The results of these runs are shown in Table II.

Run 2 was distilled to obtain a $C_8+$ material as kettle product. The recycle material was then purified in the same manner as the 1,5-COD feed as reported above in Example I. The purified feed was passed over the tungstate catalyst of Example I at 650° F., 500 p.s.i.g., 35 WHSV, and an ethylene flow rate equal to that used in Run 2. Since the $C_8+$ feed is of higher molecular weight, the ratio of ethylene to feed was higher than 10:1. The analysis of the feed and the effluent are presented below in Table III.

TABLE III

TABLE III.—ETHYLENE CLEAVAGE OF RECYCLE FEED FROM RUN 2

| GLC analysis (wt. percent) | Feed | Liquid effluent |
|---|---|---|
| $C_3$ | | 0.2 |
| $C_4$ | | 0.4 |
| $C_5$ | | 1.2 |
| Unknowns | | 0.1 |
| Cyclopentene | | 0.4 |
| Hexadiene | | 79.2 |
| $C_7$ | | 0.9 |
| $C_8$ isomers | 1.6 | 6.3 |
| 1,3-COD | 2.8 | |
| 1,5-COD | 5.4 | |
| Decatriene | 67.0 | 9.2 |
| Unknowns | 0.9 | 0.4 |
| $C_{14}$ isomers | 2.0 | 0.6 |
| Tetradecatetraene | 12.8 | 1.2 |
| Heavies | 7.4 | Trace |
| Total | 99.9 | 100.1 |

Conversion: 81.1%.
Selectivity to 1,5-hexadiene: 93.2% (mole percent of reacted feed which produced 1,5-hexadiene).

EXAMPLE III

Several more runs were made wherein 1,5-cyclooctadiene and ethylene were converted to 1,5-hexadiene. The procedure and the catalyst was the same as used in Example I. The catalyst was periodically regenerated as needed during this series of tests. In this series of runs, TABLE II.—CLEAVAGE OF 1,5-CYCLOOCTADIENE WITH ETHYLENE. EXTENDED RUNS [a]

| Run No. | Run time, hr. | WHSV [b] | Et:COD [c] | Percent conv. | Mole percent selectivity [d] | | | |
|---|---|---|---|---|---|---|---|---|
| | | | | | Hexadiene | COD isomers | Decatriene | Tetradecatetraene |
| 1 | 2 | 15 | 12:1 | 100 | 71.5 | 7.3 | 11.1 | 1.8 |
| | 4 | 15 | 12:1 | 100 | 71.0 | 8.0 | 12.7 | 1.2 |
| | 6 | 15 | 12.6:1 | 99.4 | 68.1 | 8.3 | 14.8 | 2.4 |
| | 9 | 15 | 12:1 | 99.1 | 63.0 | 9.3 | 18.0 | 2.7 |
| | 11 | 15 | 12.8:1 | 98.8 | 61.4 | 8.3 | 19.8 | 3.8 |
| 2 | 1.2 | 25 | 10:1 | 100 | 69.8 | 6.9 | 17.4 | 3.2 |
| | 2.2 | 25 | 10:1 | 100 | 71.2 | 6.3 | 17.4 | 2.6 |
| | 4.1 | 35 | 10:1 | 99.6 | 70.4 | 3.6 | 19.7 | 4.0 |
| | 5.1 | 35 | 10:1 | 99.1 | 68.4 | 3.5 | 22.0 | 3.8 |
| | 6.7 | 50 | 10:1 | 97.4 | 59.4 | 3.3 | 27.5 | 6.9 |
| | 8.5 | 50 | 10:1 | 96.6 | 56.5 | 3.0 | 28.7 | 9.0 |
| | 10.2 | 40 | 10:1 | 93.9 | 50.1 | 3.8 | 34.0 | 8.1 |
| | [e]11.6 | 25 | 10:1 | 96.4 | 50.6 | 6.2 | 31.5 | 7.1 |

[a] Run conditions: 650° F. and 500 p.s.i.g.
[b] Weight of 1,5-COD per weight of tungstate catalyst per hour.
[c] Moles ethylene per mole 1,5-COD.
[d] (Moles of component) (Moles of COD required to form 1 mole of component) / Moles of reacted COD
[e] Pressure control was erratic during collection of sample for analysis.

EXAMPLE II

To demonstrate that the heavy materials produced in the reaction of 1,5-COD with ethylene can be successfully converted to additional 1,5-hexadiene, the effluent from the conditions of temperature, pressure, WHSV, and ethylene to 1,5-cyclooctadiene were varied. The conditions of the runs and the results obtained are set forth in Table IV.

TABLE IV.—CLEAVAGE OF 1,5-CYCLOOCTADIENE WITH ETHYLENE. FEED NOT DILUTED

| Run No. | Temp., °F. | P.s.i.g. | WHSV a | Et:COD b | Percent conv. | Mole and selectivity c | | | |
|---|---|---|---|---|---|---|---|---|---|
| | | | | | | Hexa-diene | COD isomers | Deca-triene | Tetradeca-tetraene |
| 3 | 600 | 50 | 20 | 7:1 | 96.6 | 76.4 | 3.0 | 14.6 | 3.8 |
| 4 | 650 | 50 | 22 | 6:1 | 97.3 | 75.9 | 2.0 | 14.7 | 5.0 |
| 5 | 650 | 200 | 20 | 7:1 | 99.7 | 84.6 | 4.0 | 8.1 | 2.3 |
| 6 | 650 | 200 | 40 | 3.5:1 | 99.5 | 64.2 | 4.6 | 18.7 | 9.5 |
| 7 | 650 | 400 | 10 | 15:1 | 100 | 82.6 | 5.3 | 6.7 | 1.6 |
| 8 | 650 | 400 | 50 | 15:1 | 90.1 | 51.4 | 2.7 | 37.3 | 6.8 |
| 9 | 750 | 400 | 50 | 15:1 | 94.3 | 52.8 | 16.7 | 22.7 | 4.5 |
| 10 | 750 | 400 | 75 | 12:1 | 87.2 | 43.2 | 12.0 | 33.1 | 8.2 | a Weight of 1,5-COD per weight of tungstate catalyst per hour.
b Mole ratio of ethylene to 1,5-COD
c $\frac{\text{(Moles of Component)(Moles of 1,5-COD required to form 1 mole of component)}}{\text{Moles of reacted 1,5-COD}} \times 100$ The runs give an indication of the complexity of the reaction when one desires to optimize the preparation of 1,5-hexadiene. Runs 3–5 and 7 indicate that a relatively slow flow rate of 1,5-COD, an increase in ethylene ratio affords an increase in selectivity to the 1,5-hexadiene. Runs 5–8 show that when the space rate is increased without a corresponding increase in ethylene ratio, selectivity to 1,5-hexadiene is substantially reduced. Runs 7–10 demonstrate that at higher temperatures where the catalyst tends to become less active, isomerization of the 1,5-COD to cyclooctadiene isomers causes a substantial reduction in the 1,5-hexadiene product.

EXAMPLE IV

In accordance with the procedure used in Example I, several runs were made wherein the 1,5-COD feed was diluted to form a mixture containing 50 weight percent cyclohexane. The reaction conditions and results of this run are reported below in Table V.

TABLE V.—CLEAVAGE OF 1,5-CYCLOOCTADIENE WITH ETHYLENE. EFFECT OF FEED DILUTION a

| Run No. | Temp., °F. | p.s.i.g. | WHSV b | Et:COD c | Percent conv. | Mole percent selectivity d | | | |
|---|---|---|---|---|---|---|---|---|---|
| | | | | | | 1,5-hexa-diene | COD isomers | Deca-triene | Heavies e |
| 11 | 650 | 50 | 10 | 14:1 | 87.4 | 69.3 | 4.7 | 19.3 | 4.5 |
| 12 | 650 | 400 | 10 | 14:1 | 98.8 | 88.6 | 1.6 | 2.6 | 2.4 |
| 13 | 700 | 400 | 30 | 14:1 | 100 | 79.0 | 3.9 | 8.5 | 5.1 |
| 14 | 750 | 400 | 30 | 14:1 | 100 | 77.0 | 8.1 | 8.0 | 3.4 |
| 15 | 800 | 400 | 30 | 14:1 | 100 | 63.2 | 17.3 | 3.8 | 8.6 |
| 16 | 650 | 400 | 15 | 7:1 | 95.0 | 76.6 | 3.3 | 14.2 | 3.8 |
| 17 | 650 | 500 | 15 | 12:1 | 100 | 76.6 | 6.4 | 6.1 | 3.2 |
| 18 | 650 | 500 | 15 | 12:1 | 100 | 72.8 | 6.3 | 13.3 | 1.3 |
| 19 | 650 | 500 | 6.4 | 30:1 | 100 | 78.8 | 5.3 | 5.3 | 1.1 | a The feed was an equal-weight mixture of 1,5-COD and cyclohexane.
b The weight hourly space velocity is defined as weight of 1,5-COD per weight of tungstate catalyst per hour.
c Mole ratio of ethylene to 1,5-COD.
d $\frac{\text{(Moles of Component)(Moles of COD required to form 1 mole of component)}}{\text{Moles of reacted COD}}$
e The heavies were determined by reverse flow in the GLC analysis, and calculated as tetradecatetraene.

These runs show that feed dilution has a beneficial effect on 1,5-hexadiene yield.

Reasonable variations and modifications of my invention will be apparent to those skilled in the art without departing from the spirit of my invention.

I claim:

1. A process for the preparation of 1,5-hexadiene which comprises:
   catalytically cyclodimerizing butadiene to produce 1,5-cyclooctadiene;
   contacting ethylene and said 1,5-cyclooctadiene without removal of any cyclododecatriene therefrom with a tungsten oxide on silica olefin disproportionation catalyst having activity for the conversion of propylene to ethylene and butenes under suitable reaction conditions wherein the conversion is sufficient that 1,5-hexadiene is produced as the major product of the process,
   wherein said reaction conditions include a temperature in the range of 400 to 1100° F. and a pressure in the range of 0 to 1500 p.s.i.g. and an ethylene to 1,5-cyclooctadiene ratio of from 5:1 to 20:1.

2. The process of claim 1 wherein the reaction conditions include a temperature in the range of 600–900° F. and a pressure in the range of 0–500 p.s.i.g.

3. The process of claim 2 wherein the ethylene to 1,5-cyclooctadiene ratio is from 6:1 to 20:1.

4. The process of claim 1 wherein the contact is carried out in the presence of an inert hydrocarbon diluent.

5. The process of claim 4 wherein the inert hydrocarbon diluent is cyclohexane.

6. The process according to claim 1 wherein the reaction also produces 1,5,9-decatriene and isomers of 1,5-cyclooctadiene; and further including the steps of separating the product 1,5-hexadiene from 1,5,9-decatriene and 1,5-cyclooctadiene and returning the latter two hydrocarbons in further contact with the catalyst to provide additional conversion therein.

7. The process of claim 1 wherein the cyclodimerization of butadiene also produces the cyclic trimer of butadiene which is also contacted with the olefin disproportionation catalyst along with the 1,5-cyclooctadiene.

8. The process of claim 1 wherein a cyclic trimer or tetramer of butadiene is produced along with 1,5-cyclooctadiene and said trimer or tetramer is included in the feed to said olefin disproportionation catalyst along with 1,5-cyclooctadiene.

9. The process of claim 1 wherein the conversion of the cyclooctadiene reactant is at least 15 percent.

10. The process of claim 9 wherein the conversion of said cyclooctadiene reactant is at least 75 percent.

References Cited

UNITED STATES PATENTS

| | | | |
|---|---|---|---|
| 3,424,811 | 1/1969 | Mango | 260—680 |
| 3,530,196 | 9/1970 | Singleton | 260—680 |
| 3,670,043 | 6/1972 | Kubicek et al. | 260—680 X |
| 3,238,265 | 3/1966 | Mueller | 260—666 B |
| 3,250,817 | 5/1966 | Lapporte | 260—666 B |
| 3,310,591 | 3/1967 | Zuech et al. | 260—666 B |
| 3,715,410 | 2/1973 | Ray et al. | 260—680 |

PAUL M. COUGHLAN, Jr., Primary Examiner

U.S. Cl. X.R.

260—677 R